United States Patent [19]

Horikawa

[11] Patent Number: 4,616,267

[45] Date of Patent: Oct. 7, 1986

[54] OVERCURRENT DETECTION AND PROTECTION METHOD FOR PHOTOMULTIPLIER

[75] Inventor: Kazuo Horikawa, Kanagawa, Japan

[73] Assignee: Fuji Photo Film Co., Ltd., Kanagawa, Japan

[21] Appl. No.: 467,043

[22] Filed: Feb. 16, 1983

[30] Foreign Application Priority Data

Feb. 26, 1982 [JP] Japan .................................. 57-30298
Feb. 26, 1982 [JP] Japan .................................. 57-30299

[51] Int. Cl.⁴ .............................................. H04N 1/40
[52] U.S. Cl. ..................................... 358/280; 358/282; 358/285; 250/207; 250/327.2
[58] Field of Search ....................... 358/280, 282, 285; 250/206, 214 AG, 214 C, 207, 327.2

[56] References Cited

U.S. PATENT DOCUMENTS 4,174,528 11/1979 White ................................... 358/282
4,436,994 3/1984 Van Vliet et al. ................... 250/207
4,485,302 11/1984 Tanaka et al. .................... 250/327.2

Primary Examiner—James J. Groody
Assistant Examiner—Edward L. Coles, Sr.
Attorney, Agent, or Firm—Sughrue, Mion, Zinn, Macpeak, and Seas

[57] ABSTRACT

In an image scanning and read-out system wherein a sheet carrying an image recorded thereon is scanned with a light beam at an amplitude larger than the sheet width, and detecting the light from the sheet by use of a photomultiplier, the voltage applied to the photomultiplier is decreased when the output current obtained from the photomultiplier at the time the photomultiplier receives light from outside the sheet is larger than a predetermined reference level. The output current obtained when the scanning position of the light beam is at the outside of the sheet is compared with the reference level, or the period during which the output current is continuously larger than the reference level is measured to check whether it is longer than the time required for the light beam to scan the sheet width.

14 Claims, 4 Drawing Figures

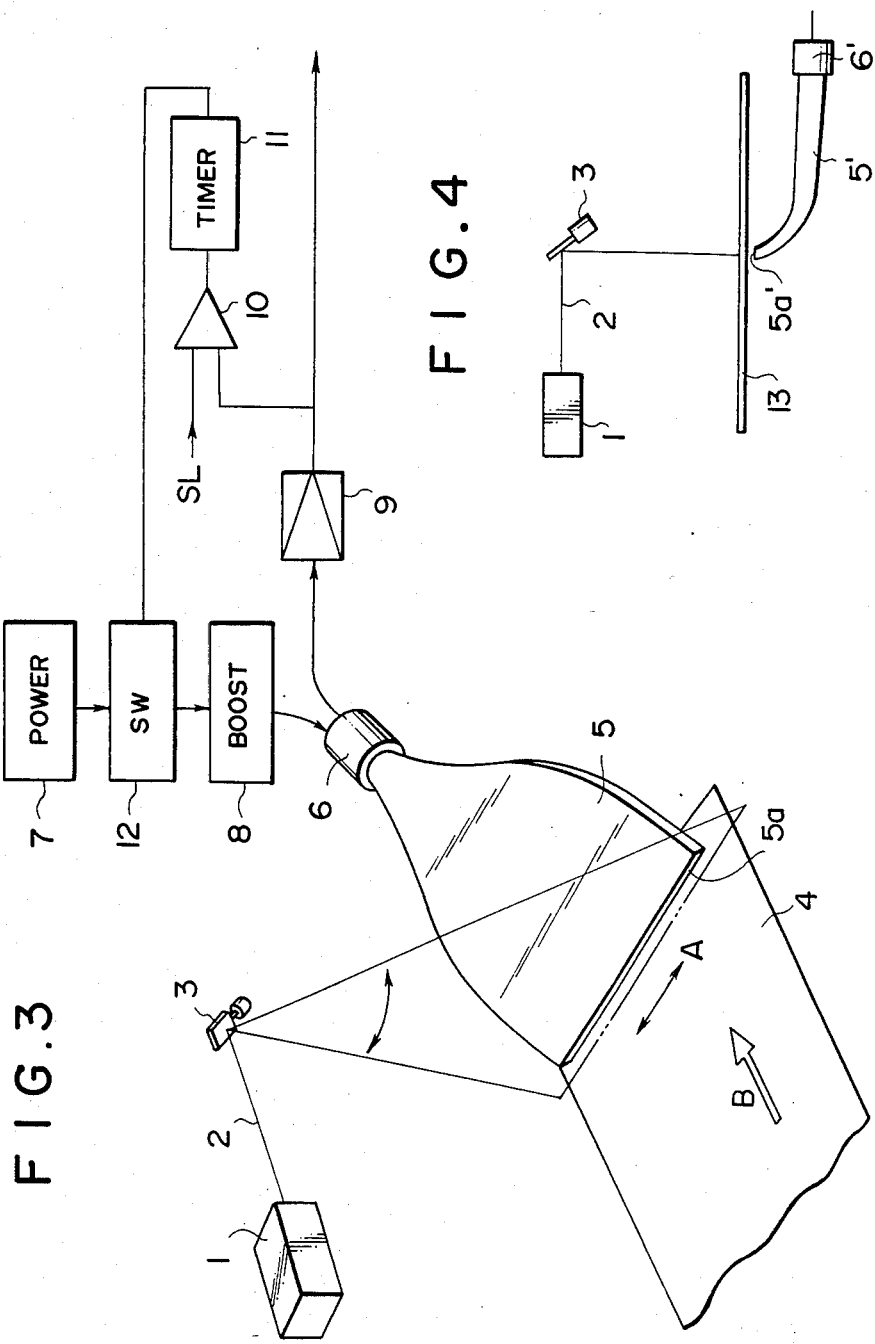

OVERCURRENT DETECTION AND PROTECTION METHOD FOR PHOTOMULTIPLIER

BACKGROUND OF THE INVENTION

1. Field of the Invention

This invention relates to a method of detecting an overcurrent flowing in a photomultiplier and protecting the photomultiplier therefrom, and more particularly to an overcurrent detection and protection method for a photomultiplier used in an image scanning and read-out method in which an image recorded on a sheet is read out by two-dimensionally scanning the sheet with a light beam such as laser beam, and detecting the light obtained from the sheet in the pattern of the recorded image by use of the photomultiplier.

2. Description of the Prior Art

Heretofore, there has been widely used a method of scanning and reading out an image in which an image recorded on a sheet is read out by two-dimensionally scanning the sheet with a light beam such as laser beam, and detecting the light (for example, reflected light or transmitted light) obtained in the pattern of the recorded image by the exposure of the sheet to the light beam by use of a photomultiplier.

Such an image scanning and read-out method using a photomultiplier is employed, for example, in an input apparatus for a computer, an image read-out apparatus for facsimile telegraphy, and the like. In the apparatus of this type, image read-out is specifically conducted as described below.

Namely, a sheet carrying an image composed of a density pattern, i.e. an original, is exposed to and two-dimensionally scanned with a light beam, and the reflected light (in the case of a paper original) or transmitted light (in the case of a film original) thereby obtained is detected and converted into a serial electric image, thereby to read out the image recorded on the original. The electric signal obtained can be processed in various ways, for example, transfer to a remote place by a transfer system, image processing, storage in a magnetic recording medium, and the like.

The aforesaid image scanning and read-out method using a photomultiplier is used also in a radiation image system using a stimulable phosphor sheet, which is disclosed, for example, in U.S. Pat. No. 4,258,264 and Japanese Unexamined Patent Publication No. 56(1981)-11395. In this system, a stimulable phosphor sheet carrying a radiation image stored therein is exposed to stimulating rays to sequentially release the radiation energy as light emission, and the light emitted upon stimulation of the sheet is photoelectrically read out.

The stimulable phosphor referred to in this invention means a phosphor which is able to store a part of radiation energy when exposed to a radiation such as X-rays, α-rays, β-rays, γ-rays or ultraviolet rays, and then emits light in proportion to the stored energy of the radiation when exposed to stimulating rays such as visible light.

In the aforesaid radiation image system using a stimulable phosphor sheet, image read-out is specifically conducted as described below.

Namely, a stimulable phosphor sheet carrying a radiation transmission image stored therein by exposing the stimulable phosphor sheet to a radiation such as X-rays passing through an object such as human body is two-dimensionally scanned with stimulating rays such as laser beam to sequentially release the radiation energy stored in the stimulable phosphor as light emission. Then, the emitted light is photoelectrically read out by a photomultiplier to obtain an image signal, thereby to read out the image stored in the stimulable phosphor sheet. Based on the obtained image signal, a visible image may be reproduced on a recording material such as photographic light-sensitive material, a cathode ray tube (CRT), or the like.

This radiation image system using the stimulable phosphor sheet is advantageous over the conventional radiography using a silver halide photographic material in that the image can be recorded over a very wide range of radiation exposure and further in that the electric signal used for reproducing the visible image can be freely processed in various ways to improve the image quality for viewing, particularly diagnostic purposes. In more detail, since the amount of light emitted upon stimulation after the radiation energy is stored in the stimulable phosphor varies over a wide range in proportion to the amount of energy stored therein, it is possible to obtain an image having desirable density regardless of the amount of exposure of the stimulable phosphor to the radiation by reading out the emitted light with an appropriate read-out gain and converting it into an electric signal to reproduce a visible image on a recording material such as photographic light-sensitive material or on a display unit such as CRT. The electric signal may further be processed in various ways as desired to obtain a radiation image suitable for viewing, particularly diagnostic purposes. This is very advantageous in practical use.

However, the image scanning and read-out apparatus based on the aforesaid image scanning and read-out method using a photomultiplier as a photodetector presents a very real problem as described below.

The photomultiplier is suitable for detecting very weak light. However, the photomultiplier has a drawback that, when the photomultiplier is exposed to strong light (i.e. light so strong as to be visually seen bright) with a voltage applied thereto, an excessive photoelectric current flows therethrough, and the photomultiplier breaks if this condition continues. Therefore, the image scanning and read-out apparatus based on the aforesaid image scanning and read-out method using the photomultiplier is so constructed that the apparatus is completely shielded from external light in order to prevent the photomultiplier from being broken due to light entering thereto from the outside of the apparatus.

However, it sometimes happens that the shielding of the apparatus from external light is incomplete due to a defective assembly process for the apparatus or due to a failure to close a portion of the apparatus opened for adjustment, maintenance or the like. If a voltage is applied to the photomultiplier in order to start the apparatus in this condition, the photomultiplier readily breaks due to external light entering the apparatus. Actually, this problem occurs very frequently, and makes the aforesaid image scanning and read-out method very uneconomic since the photomultiplier is very expensive.

One solution to the aforesaid problem is to protect the photomultiplier by stopping the voltage supply to the photomultiplier when the output current obtained from the photomultiplier exceeds a predetermined value. However, this solution is practically not preferable since the voltage supply to the photomultiplier is stopped even when there is no external light entering the apparatus, i.e. when the intensity of the reflected light, transmitted light or the light emitted from the stimulable phosphor upon stimulation thereof, which is obtained by exposing the sheet carrying an image recorded thereon to a light beam in order to read out the image, becomes larger than the aforesaid predetermined value according to the actual level of image density.

SUMMARY OF THE INVENTION

The primary object of the present invention is to provide a method of protecting a photomultiplier used in an image scanning and read-out method in which an image recorded on a sheet is read out by two-dimensionally scanning the sheet with a light beam such as laser beam, and detecting the light obtained from the sheet in the pattern of the recorded image by use of the photomultiplier, wherein the photomultiplier is protected only from light entering the image scanning and read-out apparatus from the outside thereof.

Another object of the present invention is to provide a method of protecting a photomultiplier, which also serves as a means for detecting light leaking into the image scanning and read-out apparatus even when the leak current is not so strong as to cause the photomultiplier to break.

The method of detecting an overcurrent flowing in a photomultiplier and protecting the photomultiplier therefrom in accordance with the present invention comprises the step of: in an image scanning and read-out system wherein a sheet carrying an image recorded thereon is scanned with a light beam at an amplitude larger than the width of said sheet and detecting light from said sheet by use of the photomultiplier, decreasing the value of voltage applied to said photomultiplier when the output current value of said photomultiplier obtained at the time said photomultiplier receives light not including said image during said scanning is larger than a predetermined reference level. In one aspect of the present invention, the value of voltage applied to the photomultiplier is decreased when the output current value of the photomultiplier obtained at the time the position of the scanning with the light beam is at the outside of the sheet is larger than the predetermined reference level. In another aspect of the present invention, the value of voltage applied to the photomultiplier is decreased when the output current value of the photomultiplier is continuously larger than the predetermined reference level over a period longer than the time required for the light beam to scan the width of the sheet.

As the reference level, any value may be employed insofar as it does not exceed the rated current value of the photomultiplier and the maximum output current value thereof obtained when light including an ordinary image and obtained by scanning a sheet carrying the ordinary image recorded thereon is detected by the photomultiplier.

In the present invention, when the scanning position of the light beam reaches the outside of the sheet, the output obtained from the photomultiplier becomes approximately zero if the inside of the image scanning and read-out apparatus is completely shielded from external light, and becomes a finite value if external light is entering the inside of the apparatus. Therefore, as the lower limit of the reference level, it is possible to employ the noise level of the photomultiplier mainly depending on the dark current thereof.

Practically, the reference level should preferably low. However, in view of the risk of malfunction occurring when the reference level is set to the noise level depending on the dark current of the photomultiplier, the reference level is preferably set to a level, for example, lower by a factor within the range of 10 to 20 than the rated current value of the photomultiplier.

In the present invention, decreasing the value of voltage applied to the photomultiplier embraces complete decreasing thereof to zero.

By the method of the present invention, regardless of the type of the image recorded on the sheet, it is possible to recognize that the external light is entering the inside of the apparatus if the output current value of the photomultiplier obtained when the photomultiplier receives light not including the image during the scanning is larger than the predetermined reference level. Accordingly, it is possible to protect the photomultiplier only from the light entering the apparatus from the outside thereof. The protection of the photomultiplier is conducted certainly since the voltage applied to the photomultiplier is automatically decreased when the light other than the reflected light, transmitted light or the light emitted from the stimulable phosphor upon stimulation thereof, which is obtained by exposing the sheet carrying the image recorded thereon to a light beam in order to read out the image, exists in the image scanning and read-out apparatus. Further, the method of the present invention can also be employed as a means for detecting light leaking into the apparatus even when the leak current is not so strong as to cause the photomultiplier to break.

BRIEF DESCRIPTION OF THE DRAWINGS

FIG. 3 is a schematic perspective view showing an image scanning and read-out apparatus in which another embodiment of the method in accordance with the present invention is employed, and FIG. 4 is a schematic side view showing a part of an image scanning and read-out apparatus in which a further embodiment of the method in accordance with the present invention is employed.

DESCRIPTION OF THE PREFERRED EMBODIMENTS

The present invention will hereinbelow be described in further detail with reference to the accompanying drawings.

Figure 1:
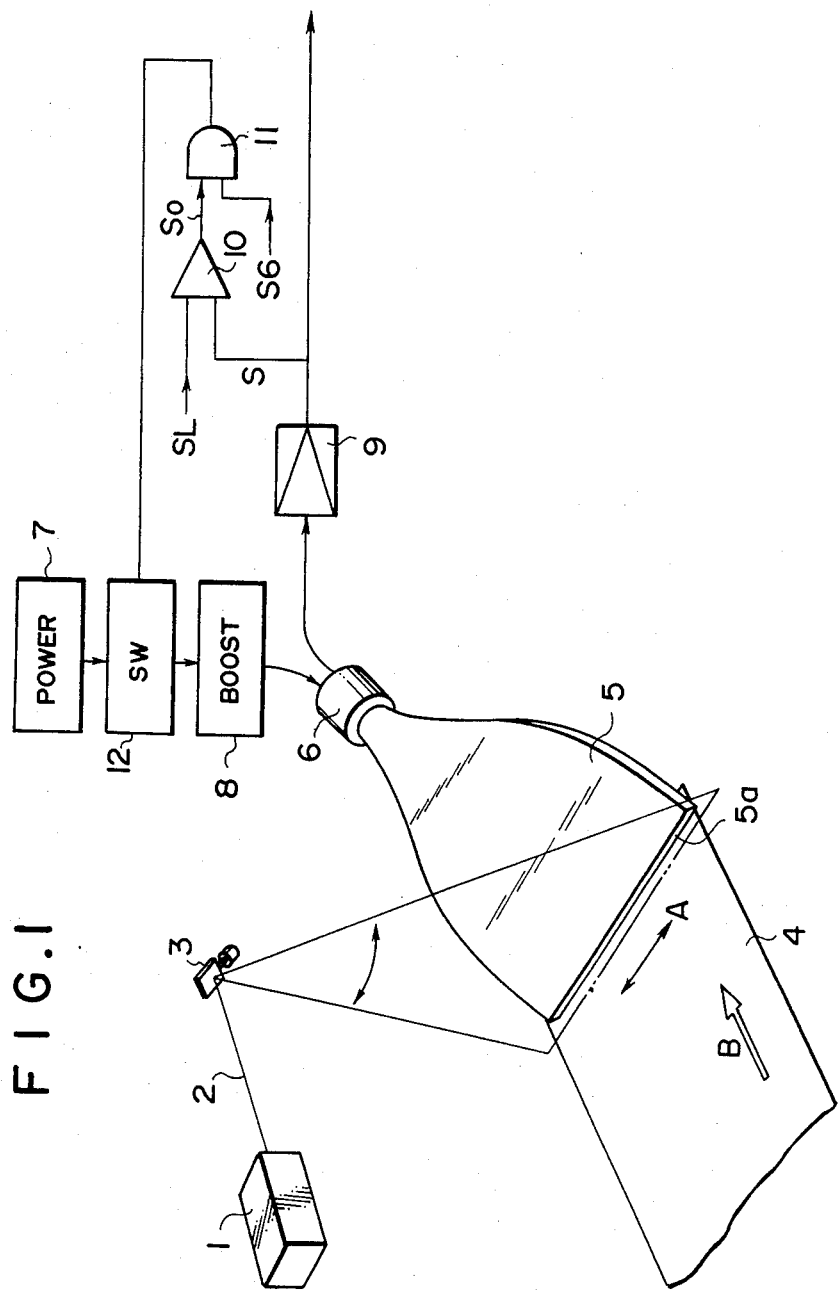
FIG. 1 is a schematic perspective view showing an image scanning and read-out apparatus in which an embodiment of the overcurrent detection and protection method for a photomultiplier in accordance with the present invention is employed.

FIG. 1 shows a radiation image system using a stimulable phosphor sheet, in which an embodiment of the method in accordance with the present invention is employed.

In the embodiment shown in FIG. 1, read-out is conducted as described below. A laser beam 2 emitted from a laser source 1 is directed by a galvanometer mirror 3 onto a stimulable phosphor sheet 4 carrying a radiation image stored therein to scan the stimulable phosphor sheet 4 in the main scanning direction indicated by the arrow A. This main scanning is conducted at an amplitude larger than the width of the stimulable phosphor sheet 4. The stimulable phosphor sheet 4 is moved in the subsidiary scanning direction indicated by the arrow B during the main scanning. As a result, the stimulable phosphor sheet 4 is two dimensionally scanned with the laser beam 2. The stimulable phosphor sheet 4 emits light in proportion to the X-ray energy stored therein when scanned with the laser beam 2, and the emitted light enters a light transfer member 5 made of a transparent sheet body from a linear light input face 5a thereof. The light entering from the light input face 5a is transmitted through the interior of the light transfer member 5 to a light output face thereof, and condensed to a light receiving face of a photomultiplier 6. The light output face of the light transfer member 5 is ring-shaped to match the circular shape of the light receiving face of the photomultiplier 6. The light entering from the linear light input face 5a is transmitted to the ring-shaped light output face by total reflection through the interior of the light transfer member 5.

Between the photomultiplier 6 and the ring-shaped light output face of the light transfer member 5 is positioned a cut filter for transmitting only the light having the wavelength distribution of the light emitted from the stimulable phosphor sheet 4 and cutting off the light having the wavelength distribution of the laser beam 2. The wavelength of the laser beam 2 is selected from the range of 600 nm to 700 nm so that it may not overlap the wavelength distribution of 300 nm to 500 nm of the light emitted from the stimulable phosphor sheet 4. The cut filter is a long-wavelength cut filter capable of cutting of wavelengths longer than 500 nm. Accordingly, the photomultiplier 6 can detect the light emitted from the stimulable phosphor sheet 4 at a high signal-to-noise ratio.

To the photomultiplier 6 is applied a high voltage obtained by stepping up the voltage fed from a power source 7 by use of a booster 8.

Figure 2:
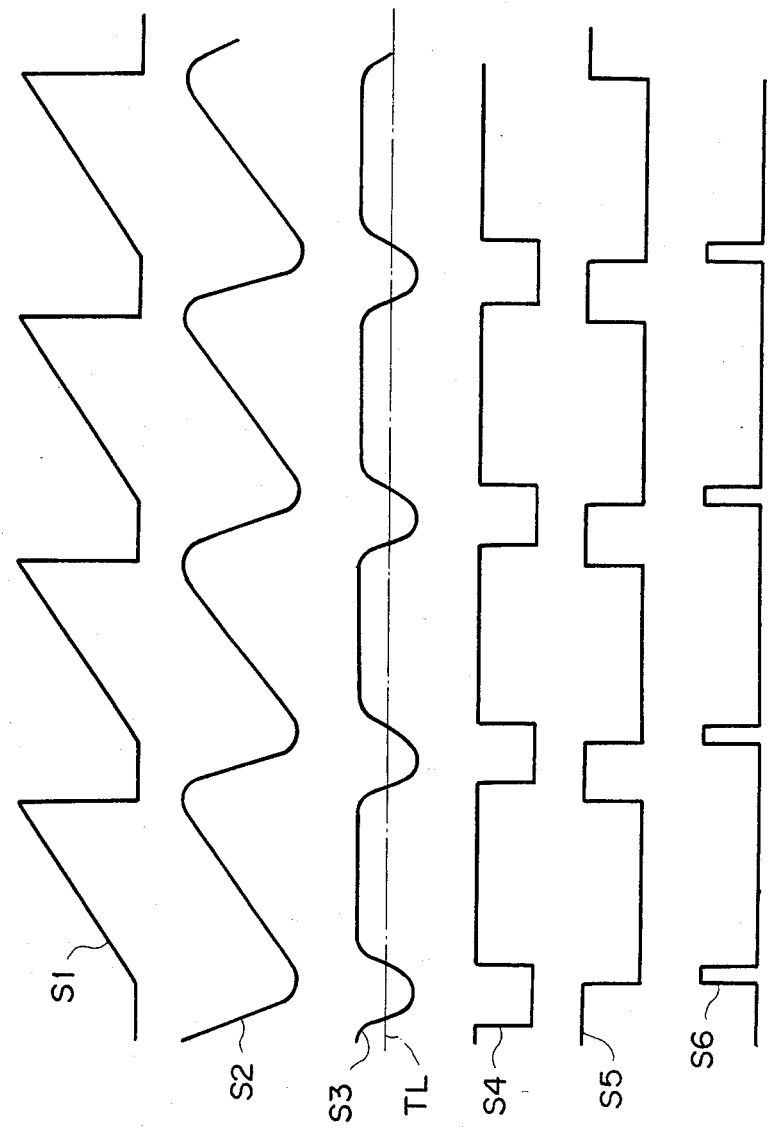
FIG. 2 is a timing chart for explaining the embodiment shown in FIG. 1.

The output current obtained from the photomultiplier 6 is amplified by an amplifier 9 and sent to the exterior of the apparatus. A part S of the current obtained from the amplifier 9 is entered to one terminal of a comparator 10, in which the part S of the current is compared with a reference level SL entering from the other terminal of the comparator 10. When the output current S of the photomultiplier 6 is larger than the reference level SL, a signal S0 is generated by the comparator 10 and entered to one terminal of an AND circuit 11. To the other terminal of the AND circuit 11 is entered a timing pulse S6, which is obtained as described below. Namely, as shown in FIG. 2, a response signal S2 showing the actual response of the galvanometer mirror 3 to a signal S1 for driving the galvanometer mirror 3 is differentiated with respect to the signal S1 to obtain a galvanometer mirror drive speed signal S3. The galvanometer mirror drive speed signal S3 is converted to a binary signal with respect to an appropriate threshold value TL, thereby to obtain a signal S4. By using the thus obtained signal S4 and a galvanometer mirror gate signal S5 for generating the drive signal S1, the AND operation represented by S4×S5 is conducted to obtain the timing pulse S6. The timing pulse S6 indicates that the main scanning position of the laser beam 2 is at the outside of the sheet 4. The output obtained from the AND circuit 11 turns on and off a switch 12 positioned between the power source 7 and the booster 8. In this manner, the output S of the photomultiplier 6 obtained when the main scanning position of the light beam is at the outside of the sheet 4 is compared with the reference level SL and, when the output S is larger than the reference level SL, the value of voltage applied to the photomultiplier 6 is set to zero.

As the method of detecting that the main scanning position of the laser beam 2 is at the outside of the sheet 4, the circuit for carrying out the method, and the like, any method, circuit and the like other than those described above may be employed.

When a sheet having a different width is scanned, the time required for the laser beam 2 to scan the sheet width changes. However, since the leak light or the like, if any, generally exists during the period of time longer than that required for the laser beam 2 to depict one scanning line (including the return time), it is possible to detect the leak light or the like when the scanning beam is positioned at any point outside the sheet.

FIG. 3 shows an image scanning and read-out apparatus in which another embodiment of the method in accordance with the present invention is employed. In FIG. 3, similar elements are numbered with the same reference numerals with respect to FIG. 1. In this embodiment, the output current obtained from the photomultiplier 6 in the same manner as described with reference to FIG. 1 is amplified by the amplifier 9 and sent to the exterior of the apparatus. A part of the current obtained from the amplifier 9 is entered to one terminal of the comparator 10, in which the part of the current is compared with the reference level SL entering from the other terminal of the comparator 10. When the output current of the photomultiplier 6 is larger than the reference level SL, a signal is generated by the comparator 10 and entered to a timer 11' to start the counting operation thereof. When the timer 11' detects that the output current of the photomultiplier 6 is continuously larger than the reference level SL over a period longer than the time required for the laser beam 2 to scan the width of the stimulable phosphor sheet 4, the timer 11' generates a signal for turning off the switch 12 positioned between the power source 7 and the booster 8.

In the embodiments described above, a black light absorber or the like is positioned at the scanning portion outside of the stimulable phosphor sheet 4 so that the laser beam 2 may not be reflected from the outside scanning portion and detected by the photomultiplier 6. Therefore, as the reference level SL, it is possible to select a level higher than the output current value normally obtained from the photomultiplier 6 when the laser beam 2 scans the outside of the stimulable phosphor sheet 4, i.e. a level higher than the noise level depending on the dark current, and involving no risk of malfunction occurring. Also when an image recorded as a density pattern on a paper original sheet is read out based on the light reflected from the sheet, read-out can be conducted in almost the same manner as the embodiments described above. In this case, however, there is no limit to the wavelength distribution of the laser beam 2, and the cut filter for cutting off the light emitted from the stimulable phosphor sheet 4 upon stimulation thereof is unnecessary.

FIG. 4 shows a part of an image scanning and read-out apparatus in which a further embodiment of the method in accordance with the present invention is employed. In this embodiment, an image recorded as a density pattern on a film original sheet 13 is read out based on the light transmitting through the sheet 13. In this case, a light input face 5a' of a light transfer member 5' is positioned along the scanning line of the laser beam 2 at the rear side of the sheet 13.

It should be understood that the present invention can be embodied in various types other than the above described embodiments. For example, instead of completely eliminating the voltage applied to the photomultiplier by the on-off switch, the voltage may be decreased to an appropriate low value to protect the photomultiplier. Further, when the voltage applied to the photomultiplier is decreased, a means for informing the voltage decrease to the operator, such as lamp or buzzer, or a means for stopping the image scanning and read-out may preferably be activated.

I claim:

1. A method of detecting an overcurrent flowing in a photomultiplier and protecting the photomultiplier therefrom in an image scanning and read-out system wherein a sheet carrying an image recorded thereon is scanned with a light beam at an amplitude larger than the width of said sheet, and detecting the light from said sheet by use of the photomultiplier, which comprises a step of:

decreasing the value of voltage applied to said photomultiplier when the output current value of said photomultiplier obtained at the time said photomultiplier receives light from outside said image during said scanning is larger than a predetermined reference level.

2. A method as defined in claim 1 which uses a stimulable phosphor sheet as said sheet provided, on the surface thereof, with a stimulable phosphor carrying said image stored therein, and scans said sheet with a light beam and detects the light emitted from said stimulable phosphor sheet upon stimulation thereof.

3. A method as defined in claim 1 which uses a sheet carrying an image consisting of a density pattern as said sheet, and has said light transmitted through said sheet.

4. A method as defined in claim 1 which uses a sheet carrying an image consisting of a density pattern as said sheet, and has said light reflected from said sheet.

5. A method as defined in claim 1 wherein a light absorbing material is positioned at the scanning portion outside of said sheet.

6. A method of detecting an overcurrent flowing in a photomultiplier and protecting the photomultiplier therefrom in an image scanning and read-out system wherein a sheet carrying an image recorded thereon is scanned with a light beam at an amplitude larger than the width of said sheet, and detecting light from said sheet by use of the photomultiplier, which comprises a step of:

decreasing the value of voltage applied to said photomultiplier when the output current value of said photomultiplier obtained at the time the scanning position of said light beam is at the outside of said sheet is larger than a predetermined reference level.

7. A method as defined in claim 6 which uses a stimulable phosphor sheet as said sheet provided, on the surface thereof, with a stimulable phosphor carrying said image stored therein, and scans said sheet with a light beam and detects the light emitted from said stimulable phosphor sheet upon stimulation thereof.

8. A method as defined in claim 6 which uses a sheet carrying an image consisting of a density pattern as said sheet, and has said light transmitted through said sheet.

9. A method as defined in claim 6 which uses a sheet carrying an image consisting of a density pattern as said sheet, and has said light reflected from said sheet.

10. A method as defined in claim 6 wherein a light absorbing material is positioned at the scanning portion outside of said sheet.

11. A method of detecting an overcurrent flowing in a photomultiplier and protecting the photomultiplier therefrom in an image scanning and read-out system wherein a sheet carrying an image recorded thereon is scanned with a light beam at an amplitude larger than the width of said sheet, and detecting light from said sheet by use of the photomultiplier, which comprises a step of:

decreasing the value of voltage applied to said photomultiplier when the output current value of said photomultiplier is continuously larger than a predetermined reference level over a period longer than the time required for said light beam to scan the width of said sheet.

12. A method as defined in claim 11 which uses a stimulable phosphor sheet as said sheet provided, on the surface thereof, with a stimulable phosphor carrying said image stored therein, and scans said sheet with a light beam and detects the light emitted from said stimulable phosphor sheet upon stimulation thereof.

13. A method as defined in claim 11 which uses a sheet carrying an image consisting of a density pattern as said sheet, and has said light transmitted through said sheet.

14. A method as defined in claim 11 which uses a sheet carrying an image consisting of a density pattern, as said sheet, and has said light reflected from said sheet.

* * * * *